United States Patent
Ruiz Avilés et al.

(10) Patent No.: US 10,362,516 B2
(45) Date of Patent: Jul. 23, 2019

(54) HO PERFORMANCE INDICATORS FOR TUNING HO PARAMETERS WHICH ARE BASED ON RADIO CHANNEL QUALITY BEFORE HO

(71) Applicant: Telefonaktiebolaget LM Ericsson (publ), Stockholm (SE)

(72) Inventors: José Maria Ruiz Avilés, Málaga (ES); Victor Buenestado Garcia, Málaga (ES); Adriano Mendo Mateo, Málaga (ES); Salvador Pedraza Moreno, Málaga (ES); Miguel Angel Regueira Caumel, Málaga (ES); Matias Toril Genovés, Málaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 15/526,869

(22) PCT Filed: Nov. 17, 2014

(86) PCT No.: PCT/EP2014/074743
§ 371 (c)(1),
(2) Date: May 15, 2017

(87) PCT Pub. No.: WO2016/078685
PCT Pub. Date: May 26, 2016

(65) Prior Publication Data
US 2017/0318509 A1    Nov. 2, 2017

(51) Int. Cl.
*H04W 24/02* (2009.01)
*H04W 24/08* (2009.01)
(Continued)

(52) U.S. Cl.
CPC . *H04W 36/0083* (2013.01); *H04W 36/00837* (2018.08); *H04B 17/309* (2015.01);
(Continued)

(58) Field of Classification Search
CPC ............... H04W 36/0083; H04W 36/00837
(Continued)

(56) References Cited

U.S. PATENT DOCUMENTS

2013/0250908 A1* 9/2013 Bach ................. H04W 52/0206
370/331
2013/0272285 A1* 10/2013 Goldsmith ............ H04W 24/02
370/338
(Continued)

FOREIGN PATENT DOCUMENTS

WO   WO 2010 121418    10/2010
WO   WO 2013 020584    2/2013

OTHER PUBLICATIONS

International Search Report for International application No. PCT/EP2014/074743—dated Aug. 7, 2015.
(Continued)

*Primary Examiner* — Peter G Solinsky
(74) *Attorney, Agent, or Firm* — Sage Patent Group (57) ABSTRACT

Known HO performance indicators comprise Retainability Rate and HO Successful Rate. The Retainability Rate is defined as the ratio between abnormal connection releases and the total number of releases, and HO Successful Rate is defined as the ratio of successful HOs and the total number of HO attempts. The application proposes two new HO performance indicators LowCqiRateWhenHo (522) and LowUlSinrRateWhenHo (524). These two HO performance indicators are based on radio link conditions before a HO for the DL and UL channels respectively. The indicator LowCqiRateWhenHo is defined as the ratio of low, i.e. below a (Continued)

threshold (514). CQI measurement samples of users (502) just before a HO and is as a measure of DL connection quality during HO. The indicator LowUlSinrRateWhen Ho is defined as the ratio of low, i.e. below a threshold (516). SINR measurement samples (506) in UL just before a HO and is as a measure of UL connection quality during HO. The inter-HO performance indicators disclosed herein have been successfully used to optimize iRAT HO parameters in a live network. The proposed indicators may be used as an input of Self-Optimizing Network Optimization Manager SON OM algorithms for tuning iRAT HO parameters and intra-HO parameters.

31 Claims, 7 Drawing Sheets

(51) Int. Cl.
*H04W 36/00* (2009.01)
*H04W 36/14* (2009.01)
*H04B 17/309* (2015.01)

(52) U.S. Cl.
CPC ............ *H04W 24/02* (2013.01); *H04W 24/08* (2013.01); *H04W 36/14* (2013.01)

(58) Field of Classification Search
USPC .......................................................... 370/311
See application file for complete search history.

(56) References Cited

U.S. PATENT DOCUMENTS

| | | |
|---|---|---|
| 2014/0045500 A1 | 2/2014 | Dimou et al. |
| 2014/0087729 A1 | 3/2014 | Olofsson et al. |
| 2015/0189533 A1* | 7/2015 | Fehske .................. H04W 16/18 370/229 |
| 2015/0304931 A1* | 10/2015 | Xu ........................ H04W 36/32 370/331 |
| 2017/0070896 A1* | 3/2017 | Shindo .................. H04W 24/02 |
| 2017/0135003 A1* | 5/2017 | Suarez .................. H04W 28/08 |
| 2017/0201909 A1* | 7/2017 | Kobayashi ............ H04W 24/02 |

OTHER PUBLICATIONS

Multi-Technology Self-Optimization by Juan Ramiro et al. (Self-Organizing Networks: Self-Planning, Self-Optimization and Self-Healing for GSM, UMTS and LTE; First Edition. Edited by Juan Ramiro and Khalid Hamied; Published by John Wiley & Sons, Ltd.—2012.
A SON-Based Algorithm for the Optimization of Inter-RAT Handover Parameters by Ahmad Awada et al.; IEEE transactions on Vehicular Technology, vol. 62, No. 5—Jun. 2013.
LTE; Telecommunication management; Performance Management (PM); Performance measurements Evolved Universal Terrestrial Radio Access Network (E-UTRAN) (3GPP TS 32.425 version 12.0.0 Release 12)—Oct. 2014.
A Location-Based Self-Optimizing Algorithm for the Inter-Rat Handover Parameters by Ahmad Awada et al.; IEEE ICC—Wireless Networking Symposium—2013.
3rd Generation Partnership Project; Technical Specification Group Services and System Aspects; Telecommunication Management; Self-Organizing Networks (SON) Policy Network Resource Model (NRM) Integration Reference Point (IRP); Requirements (Release 11); 3GPP TS 32.521 v11.1.0—Dec. 2012.
Optimization of Handover Parameters for Traffic Sharing in Geran by Matias Toril and Volker Wille; Springer Science+Business Media, LLC. 2008—Published online: Feb. 22, 2008.
Minimizing Handover Performance Degradation Due to LTE Self Organized Mobility Load Balancing by Stephen S. Mwanje et al.; Ilmenau University of Technology, Ilmenau, Germany—IEEE 2013.

* cited by examiner

HO PERFORMANCE INDICATORS FOR TUNING HO PARAMETERS WHICH ARE BASED ON RADIO CHANNEL QUALITY BEFORE HO

PRIORITY

This nonprovisional application is a U.S. National Stage Filing under 35 U.S.C. § 371 of International Patent Application Serial No. PCT/EP2014/074743 filed Nov. 17, 2014, and entitled "HO Performance Indicators For Tuning HO Parameters Which Are Based On Radio Channel Quality Before HO."

TECHNICAL FIELD

The invention relates to inter Radio Access Technology (iRAT) handover (HO) (hereafter referred as inter-HO or iRAT HO) and intra-RAT HO (hereafter referred as intra-HO) in a telecommunications network. Specifically, the invention relates to methods and apparatus for measuring and/or improving iRAT HO and/or intra-RAT HO performance.

BACKGROUND

With the deployment of 4G networks, cellular operators are able to manage up to three partly overlapped different RATs (e.g., 2G, 3G and 4G (or Long Term Evolution (LTE)). In practice, the latest RAT (e.g., LTE) is usually deployed over areas completely covered by more mature technologies (e.g., 2G and 3G) and it is therefore common that coverage holes in LTE are served by other radio access technologies. To make the most of the new infrastructure, operators try to maximize time spent by users on LTE without degrading network performance and user quality of service. Thus, iRAT mobility robustness optimization has been identified as an important use case of self-organizing network by Next Generation Mobile Networks (NGNM) alliance and $3^{rd}$ Generation Partnership Project (3GPP).

In LTE, iRAT HO is typically initiated when the measured signal level from the serving cell (given by Reference Symbol Received Power, RSRP) is lower than a certain threshold. By tuning this signal-level threshold, it is possible to decide how long users are kept on LTE before sending them to another RAT. The aims of most self-tuning algorithms for iRAT HO parameters in recently deployed RATs include: a) to keep users as long as possible in the new technology (in this case, LTE), while not degrading their connection quality excessively, and b) send users experiencing degraded connection quality to other technologies before connection quality becomes too low. In this context, it is essential to have a performance indicator that indicates, for each cell, if users are being sent to other RATs too early or too late. More importantly, such a performance indicator should give an indication of potential connection quality problems due to iRAT HO before problems occur.

Currently, widely used high level performance indicators (e.g., Retainability, HO Success Rate, etc.) could be used to detect if users are being sent to other technologies too early or too late. Keeping users too long on LTE should degrade these performance indicators and sending it to early should improve them. Therefore, they can be considered to know iRAT HO performance.

In Awada et al. "A SON-Based Algorithm for the Optimization of Inter-RAT Handover Parameters" an algorithm is proposed for optimizing iRAT HO parameters in each cell. As a measurement of iRAT HO performance from LTE to 3G, it proposes (among others): a) the number of User Equipment (UE) drops before an iRAT HO is initiated or executed from LTE to 3G (referred to as Too Late iRAT HO (TLIH)), and b) the number of UEs that reconnect again to LTE just after they have triggered an iRAT HO to 3G (referred to as Too Early iRAT HO (TEIH)). Such a categorization of radio link failures due to iRAT HO was already performed by 3GPP in TS 32.425.

In Awada et al. "A location-based self-optimizing algorithm for the inter-RAT handover parameters" and in WO2013020584, there is proposed a new category of iRAT HO, namely unnecessary iRAT HO (UIH). An iRAT HO is determined to be UIH if, after the handover from LTE to 3G, the signal quality of the old LTE cell is still higher than a certain threshold for a defined time interval. Signal quality is measured by means of the Reference Signal Received Quality (RSRQ).

In WO2010121418, a method for detecting HO problems by measuring link quality when a HO is performed is proposed. In the method, at least one measurement of link quality between the terminal and any of the base stations must be taken at the end of a successful HO, which is later analyzed to detect a HO problem. WO2010121418 specifies that the system must include at least a first radio base station, a second radio base station and a mobile terminal able to communicate with both base stations.

Whilst the above refers to iRAT-HO and corresponds to a sort of inter-system handover between one system and another, there are other concerns more specific of HO between different cells of a particular system, namely intra-HO.

In intra-HO scenarios, Load Balance (LB) algorithms based on tuning handover parameters is known as Mobility Load Balancing (MLB) and has been widely used in different RATs. In particular, MLB has been identified in LTE as an important use case of Self-Organizing Networks (SONs). MLB is carried out by triggering intra-HOs from congested cells to less loaded cells earlier and delaying intra-HOs from less loaded cells to congested cells. This effect can be achieved by adjusting intra-HO margins between adjacent cells, defining by how much the pilot signal level received from the new cell has to exceed that of the serving cell to trigger the intra-HO. Such an adjustment can be done on a per-adjacency basis, i.e. per each couple of source and target cells.

However, MLB with adjusting (changing) intra-HO margins from respective default values have proved in field trials the impairment of connection quality. For example, an issue with load balancing is acute for users travelling from an 'empty' cell to a 'congested' cell, wherein intra-HO is delayed since: i) the congested cell has a larger utilization of radio resources and the probability that a user in the empty cell collides with other user in the congested cell is very high; and ii) the cell border between both cells get closer to the congested cell.

In the past, some solutions have been applied to avoid connection quality problems associated to MLB:

1) Detection from HO Failure Ratio. Using HO failure ratio to decide when HO parameters can be modified is common practice. HO failure ratio is calculated as the ratio between the numbers of HO failures and the total number of HOs in a per adjacency basis. Thus, MLB will be only applied in adjacencies where HO failure ratio is not high, in the hope that this will avoid degradation in high level indicators (e.g., retainability, and HO failure ratio).

2) Detection by classification of HO failures. 3GPP TS 32.521 defines two types of HO failures: 1) Too Late HOs, which are HOs failures due to too late HO triggering, and 2) Too early HOs, corresponding to HOs failures due to too early HO triggering. Both indicators can be measured on a per-adjacency basis. As a measure of HO quality, these indicators can be used to detect problems in HO margins, and can thus be used to stop MLB in certain adjacencies. Specifically, adjacencies where the number of too early HOs (or too late HOs) would not bring forward (or delay) HO by tuning HO parameters.

3) Avoidance by tuning HO signal-level constraints. In Toril & Wille "Optimization of Handover Parameters for Traffic Sharing in GERAN", a self-tuning method is proposed to jointly optimize HO margins, HO signal-level constraints and cell reselection offsets for congestion relief. Increasing signal-level constraints on outgoing adjacencies includes additional constraints on the HO, which delays the HO. When signal-level constraints are large enough, a minimum connection quality is enforced in HOs from the congested cell to the adjacent cell. Such a restriction on HO should only be done when HO margins become negative and the target cell in the adjacency could be highly interfered, which is the case after MLB.

4) Detection/avoidance by adaptation of HO margin step by reinforcement learning. In Mwanje & Mitschele-Thie "Minimizing Handover Performance Degradation Due to LTE Self Organized Mobility Load Balancing", a Q-learning algorithm is proposed to find the best change in the HO margins when a cell is congested in a LTE network. The aim of the algorithm is to reallocate users to solve congestion problems with minimum impact on connection quality performance. For this purpose, during an exploration phase, the algorithm performs different changes of HO margins and evaluates the impact of every change on network performance in terms of cell load and too early HO probability. Those HO margin settings causing high radio link failures due to too early HO are given a penalty, so that they are finally discarded.

5) Method for HO problem identification. In WO2010121418, a method is proposed for detecting HO problems by measuring link quality when a HO is performed. In the method, at least one measurement of link quality between the terminal and any of the base stations must be taken at the end of a successful HO or between a time of a handover trigger and a time of a handover execution completion, which is later analyzed to detect a HO problem.

In the above discussion, several performance indicators have been introduced as a measurement of iRAT HO performance. A first group of performance indicators, consisting in widely used high level performance indicators (e.g. Retainability, HO Successful Rate, etc.), have an important limitation. Degradation in some of these performance indicators could be caused by other reasons than a bad configuration of iRAT HO parameters, and thus, they are difficult to use as a measurement of iRAT HO performance.

A second group of performance indicators, consisting of TLIH and TEIH proposed in Awada et al. "A SON-Based Algorithm for the Optimization of Inter-RAT Handover Parameters" have several important limitations. TLIHs and TEIHs can be caused for different reasons than LTE channel quality problems (e.g., cell congestion, 2G/3G channel quality problems . . . ). Likewise, TLIH (and TEIH) counts as a UE drop (or reconnection), which means that the problem is already present in the network (i.e., it has been detected too late), and it would be desirable to detect potential connection quality problems during iRAT HO before these take place.

The UIR indicators proposed in Awada et al. "A location-based self-optimizing algorithm for the inter-RAT handover parameters" and in WO2013020584 detect unnecessary iRAT HOs, but have two important limitations:

1) UIR is based on RSRQ measurements, and it is therefore only focused on DL channel. In large LTE cells, where the number of iRAT HOs is usually higher, cell edge performance is given by UL channels, which experience worse performance than DL channels due to the UE transmission power limitation. Thus, it is very important to check UL channel quality before an iRAT HO.

2) UIR only detects good performance previously to an iRAT HO, what would allow delay iRAT HO and keep users on LTE longer (note that performance is based only on DL channel). However, it would be desirable to detect also poor channel quality in LTE, so that iRAT HOs is triggered earlier (i.e., iRAT HO point is brought forward), avoiding potential drops before iRAT HO is triggered. This problem could be solved by using TLIH to complement UIR, but this counter, as has been already explained, presents some limitations.

Finally, the method proposed in WO2010121418 describes a general framework for detecting HO problems based on measurements of link quality taken at the end of a successful HO or between a time of a handover trigger and a time of a handover execution completion.

Furthermore, previous solutions that have been applied to avoid connection quality problems associated to MLB also have some limitations that proposed solution tries to overcome. For different reasons, the above-described solutions cannot be used in the MLB algorithm in the SON OM tool for LTE.

The use of HO failure ratio as a brake of MLB algorithm has important limitations. First, a large HO failure ratio can be due to different reasons, which may not be related to channel quality degradation caused by MLB (e.g., congestion problems and/or control channel problems). Only HO failure caused by channel conditions during HO process should be taken into account, since MLB algorithm will affect directly the channel quality. Secondly, and perhaps most importantly, a large HO failure ratio means that connection quality has already been degraded excessively, since a high-level performance indicators (e.g., HO failure ratio) is negatively affected. Although HO failure ratio is a potential HO performance indicator to use as MLB brake, it would be desirable to have an indicator that detects poor HO performance due to channel quality problems before HO failures occur. Finally, HO failure rate may be caused by bad connection quality in UE-SC (User Equipment-to-Source Cell) or UE-TC (User Equipment-to-Target Cell) links. Thus, it is not possible to know which link is the cause of HO failures.

SUMMARY

Exemplary methods and apparatus disclosed herein overcome or at least mitigate one or more of the problems described above or other problems that will be apparent to the skilled person.

In a first aspect, there is provided a network node in a telecommunications network for control of handover triggers. The network node comprises a receiving means, which may be a receiver, configured to receive Uplink, UL, and Downlink, DL, quality data samples of a user equipment, UE, the quality data samples comprising a plurality of UL Signal to Interference plus Noise Ratio, ULSINR, data samples relating to the quality of an UL channel and a plurality of Channel Quality Indicator, CQI, data samples relating to the quality of a DL channel. The network node comprises a UE measurement selection means, which may be a UE measurement selector, configured, following a handover of the UE from a source cell to a target cell, to select, from the received ULSINR data samples and CQI data samples, data samples relating to a time period preceding the handover. The network node comprises a performance indicator determining means, which may be a performance indicator determiner, configured to determine at least two performance indicators indicating the performance of the handover, based on a number of selected ULSINR data samples, NoLowSINRsamples, with a value lower than a ULSINR threshold, $ULSINR_{min}$, and based on a number of CQI data samples, NoLowCQIsamples, with a value lower than a CQI threshold value, $CQI_{min}$. The network node comprises a parameter tuning menas, which may be a parameter tuner configured to tune one or more parameters controlling triggers of subsequent handovers, based on the determined performance indicators.

Optionally, the one or more tuned parameters control at least one trigger of: increasing a handover margin for a subsequent handover; and decreasing a handover margin for a subsequent handover.

Optionally, the network node further comprises a counter determining means, which may be a counter determiner, configured to determine NoLowCQIsamples.

Optionally, the counter determiner is further configured to determine NoLowSINRsamples.

Optionally, the counter determiner is further configured to determine a total number of CQI data samples, TotalNoCQIsamples, in the selected CQI samples.

Optionally, the counter determiner is further configured to determine a total number of ULSINR data samples, TotalNoSINRsamples, in the selected ULSINR samples.

Optionally, the performance indicator determiner is configured to determine the at least two performance indicators based on a ratio of NoLowSINRsamples, to TotalNoSINRsamples and a ratio of NoLowCQIsamples to TotalNoCQIsamples.

Optionally, the handover is an inter Radio Access Technology handover, hereinafter iRAT HO, between a first Radio Access Technology, RAT, and a second RAT, wherein the source cell is a cell of the first RAT and the target cell is a cell of the second RAT, and wherein the selected data samples and computations thereof apply on a per-source-cell basis.

Optionally, the one or more parameters are tuned by the parameter tuner to move iRAT HO border, between the source cell and the target cell, closer to the source cell, if at least one of the two performance indicators is higher than a performance high-threshold.

Optionally, the one or more parameters are tuned by the parameter tuner to move iRAT HO border, between the source cell and the target cell, away from the source cell, if both two performance indicators are lower than a performance low-threshold.

Optionally, the handover is an intra Radio Access Technology handover, hereinafter intra-HO, wherein the source and target cells are cells of a same Radio Access Technology, RAT, wherein the source and target cells are adjacent cells and wherein the selected data samples and computations thereof apply on a per-adjacency basis.

Optionally, the one or more parameters are tuned by the parameter tuner to move intra-HO border, between the source cell and the target cell, away from the source cell, if both two performance indicators are lower than a performance low-threshold value.

Optionally, the one or more parameters are tuned by the parameter tuner to move intra-HO border, between the source cell and the target cell, closer to the source cell, if at least one of the two performance indicators is higher than a performance high-threshold value.

Optionally, the one or more parameters are tuned by the parameter tuner to increase a handover margin between the source cell and the target cell to carry out Mobility Load Balancing, MLB, by moving intra-HO border, between the source cell and the target cell, away from the source cell, if both two performance indicators are below a performance low-threshold value.

Optionally, the one or more parameters are tuned by the parameter tuner to decrease a handover margin between the source cell and the target cell to carry out Mobility Load Balancing, MLB, by moving intra-HO border, between the source cell and the target cell, closer to the source cell, if at least one of the two performance indicators is above a performance high-threshold value.

In a second aspect, there is provided a method for operating a network node in a telecommunications network for control of handover triggers. The method comprises receiving, by a receiver, Uplink, UL, and Downlink, DL, quality data samples of a user equipment, UE, the quality data samples comprising a plurality of UL Signal to Interference plus Noise Ratio, ULSINR, data samples relating to the quality of an UL channel and a plurality of Channel Quality Indicator, CQI, data samples relating to the quality of a DL channel. The method comprises selecting, by a UE measurement selector following a handover of the UE from a source cell to a target cell, from the received ULSINR data samples and CQI data samples, data samples relating to a time period preceding the handover. The method comprises determining, by a performance indicator determiner, at least two performance indicators indicating the performance of the handover, based on a number of selected ULSINR data samples, NoLowSINRsamples, with a value lower than a ULSINR threshold, $ULSINR_{min}$, and based on a number of CQI data samples, NoLowCQIsamples, with a value lower than a CQI threshold value, $CQI_{min}$. The method comprises tuning, by a parameter tuner, one or more parameters controlling triggers of subsequent handovers, based on the determined performance indicators.

Optionally, the one or more tuned parameters control at least one trigger of: increasing a handover margin for a subsequent handover; and decreasing a handover margin for a subsequent handover.

Optionally, the method further comprises a counter determiner determining NoLowCQIsamples.

Optionally, the counter determiner determines NoLowSINRsamples.

Optionally, the counter determiner determines a total number of CQI data samples, TotalNoCQIsamples, in the selected CQI samples.

Optionally, the counter determiner determines a total number of ULSINR data samples, TotalNoSINRsamples, in the selected ULSINR samples.

Optionally, the performance indicator determiner is configured to determine the at least two performance indicators based on a ratio of NoLowSINRsamples, to TotalNoS-INRsamples and a ratio of NoLowCQIsamples to TotalNoC-QIsamples.

Optionally, the handover is an inter Radio Access Technology handover, hereinafter iRAT HO, between a first Radio Access Technology, RAT, and a second RAT, wherein the source cell is a cell of the first RAT and the target cell is a cell of the second RAT, and wherein the selected data samples and computations thereof apply on a per-source-cell basis.

Optionally, the one or more parameters are tuned by the parameter tuner to move iRAT HO border, between the source cell and the target cell, closer to the source cell, if at least one of the two performance indicators is higher than a performance high-threshold.

Optionally, the one or more parameters are tuned by the parameter tuner to move iRAT HO border, between the source cell and the target cell, away from the source cell, if both two performance indicators are lower than a performance low-threshold.

Optionally, the handover is an intra Radio Access Technology handover, hereinafter intra-HO, wherein the source and target cells are cells of a same Radio Access Technology, RAT, wherein the source and target cells are adjacent cells and wherein the selected data samples and computations thereof apply on a per-adjacency basis.

Optionally, the one or more parameters are tuned by the parameter tuner to move intra-HO border, between the source cell and the target cell, away from the source cell, if both two performance indicators are lower than a performance low-threshold value.

Optionally, the one or more parameters are tuned by the parameter tuner to move intra-HO border, between the source cell and the target cell, closer to the source cell, if at least one of the two performance indicators is higher than a performance high-threshold value.

Optionally, the one or more parameters are tuned by the parameter tuner to increase a handover margin between the source cell and the target cell to carry out Mobility Load Balancing, MLB, by moving intra-HO border, between the source cell and the target cell, away from the source cell, if both two performance indicators are below a performance low-threshold value.

Optionally, the one or more parameters are tuned by the parameter tuner to decrease a handover margin between the source cell and the target cell to carry out Mobility Load Balancing, MLB, by moving intra-HO border, between the source cell and the target cell, closer to the source cell, if at least one of the two performance indicators is above a performance high-threshold value.

In a third aspect, there is provided a computer program comprising instructions which, when executed on at least one processor, cause the at least one processor to carry out the method above.

In a fourth aspect, there is provided a carrier containing the computer program above, wherein the carrier is one of an electronic signal, optical signal, radio signal, or non-transitory computer readable storage medium.

DETAILED DESCRIPTION

Methods and apparatus disclosed herein propose two HO performance indicators for detecting poor iRAT HO performance on a per-cell basis, i.e. per each source cell, and/or intra-HO performance on a per-adjacency basis, i.e. per pair of source and target cells. The performance indicators may be determined from statistical measurements in a network management system of a telecommunications network.

As used herein, an adjacency may be defined as a relation between two cells. If we have two cells a and b, an indicator X on a cell-by-cell basis refers only to one cell (e.g. X(a) or X(b)), but an indicator Y on an adjacency-by-adjacency basis refers to the relation between both cells (i.e. Y(a,b)). An example of indicator on an adjacency-by-adjacency basis is the number of HOs (numHO). If numHO(a,b)=15, that means that 15 HOs have been carried out from cell a toward cell b.

When the performance indicators refer to iRAT HO performance, they may be used to decide if users are being sent from one RAT, say Long Term Evolution (LTE), to another RAT, say 3G, too early or too late and thus provide improvements to performance, e.g., to keep users as long as possible on LTE without degrading network performance. When the performance indicators refer to intra-HO performance, apart from a similar usage as for iRAT HO performance, they can also be used to avoid network performance degradation when MLB is performed.

Methods and apparatus disclosed herein may be implemented as a centralized configuration in the Operations Support System (OSS) of a telecommunications network and/or as a decentralized solution in an eNodeB. This is possible since the performance indicators may be determined using information that is collected in a single cell. The proposed indicators may be used as an input of Self-Optimizing Network Optimization Manager SON OM algorithms for tuning iRAT HO parameters and intra-HO parameters.

The inventors have appreciated that known methods (in particular WO2010121418) do not take into account measurements before HO is triggered, whereas methods and apparatus disclosed herein measure link quality before iRAT HO and/or intra-HO is triggered. Also, the inventors have appreciated that known methods do not describe any method or algorithm for detecting such problems. In particular, it is not specified which link (i.e., UL or DL), magnitude (e.g., CQI, SINR, Hybrid Automatic Repeat reQuest fail ratios . . . ) or operation (e.g., time average, percentile, thresholds . . . ) must be considered for detecting problems. Hence, the inventors have appreciated that known methods do not define any specific connection performance indicator that can be used to detect potential problems that might be caused if iRAT HO parameters are changed.

Methods and apparatus disclosed herein describe a system (and nodes of a system) configured to implement one or more steps of a process that aims to compute at least two new HO performance indicators based on radio link measurements collected for users before performing a HO. The proposed indicators reflect the overall quality of HOs. HO quality is measured considering both uplink (UL) and downlink (DL) quality.

Two specific system solutions and associated nodes are disclosed herein: a) a decentralized solution in the eNodeB, and b) a centralized solution in the OSS. Either solution is possible since the process may be undertaken using data from a single cell (even in case of intra-HO, the adjacency information may be available from the source cell), for a certain report output period. Although the methods and apparatus disclosed are defined for LTE networks, it can be extended to other radio access technologies.

The HO performance indicators may include one or more of: a) the ratio of low (i.e. below a threshold) CQI measurement samples of users just before a HO (hereafter referred to as LowCqiRateWhenHO), as a measure of DL connection quality during HO, and b) the ratio of low (i.e. below a threshold) SINR measurement samples in UL just before a HO (hereafter referred to as LowUISinrRateWhenHo), as a measure of UL connection quality during HO.

In particular, and as further explained in more detail, LowCqiRateWhenHO and LowUISinrRateWhenHo may be calculated on a per-entity basis, where the entity (hereafter referred to as e) can be a cell (for iRAT HO) or an adjacency (for intra-HO).

The entity may be a cell when indicators refer to iRAT HO performance, and may be an adjacency, i.e. pair of source cell and target cell, when indicators refer to intra-HO performance, and the parameters LowCqiRateWhenHO and LowUISinrRateWhenHo may be expressed as follows:

$$LowCqiRateWhenHo(e) = \frac{NoLowCQIsamples(e)}{TotalNoCQIsamples(e)}$$

$$LowUISinrRateWhenHo(e) = \frac{NoLowSINRsamples(e)}{TotalNoSINRsamples(e)}$$

Wherein TotalNoCQIsamples(e) is the total number of CQI samples measured within a time window ($T_{WINDOW}$) before the HO for all users that performed the HO and per-entity basis, and NoLowCQIsamples(e) is a number of CQI samples with a CQI value lower than or equal to $CQI_{min}$ measured within the $T_{WINDOW}$ before the HO for all users that performed the HO and per-entity basis. As calculated in this expression, one has to conclude that 0≤LowCqiRateWhenHo≤1.

Wherein TotalNoSINRsamples(e) is the total number of UL SINR samples measured within a time window ($T_{WINDOW}$) before the HO for all users that performed the HO and per-entity basis, and NoLowSINRsamples(e) is a number of UL SINR samples with a UL SINR value lower than or equal to $ULSINR_{min}$ measured within the $T_{WINDOW}$ before the HO for all users that performed the HO and per-entity basis. As calculated in this expression, one has to conclude that 0≤LowUISinrRateWhenHo≤1.

The inputs to an algorithm disclosed herein comprise a radio link measurement of CQI and UL SINR values for a plurality of users performing a HO, together with HO information providing data relating to the user (or UE), source and target cell (the latter only in the case of an intra-HO) involved in the HO.

Radio link measurements associated with the last N seconds before a HO may be taken into account for computing the proposed HO performance indicators. By discarding measurements out of this time window, it is aimed to neglect connection quality problems that are not due to HO parameter settings. Each radio measurement sample may comprise: a) the number of samples for each value of CQI, which may be in a range, for example, from 0 to 15; and b) the number of samples for each interval of SINR values in the UL.

In LTE, all the required information (i.e., radio link measurements and HO information broken down per HO event) is available in cell traces. Thus, the main input to the algorithm could be cell traces collected in a certain geographical area.

The outputs of the algorithm comprise values of the two HO performance indicators showing UL and DL connection quality just before HO, i.e. within $T_{WINDOW}$ seconds, for each cell in the case of iRAT HO and for each adjacency in the case of intra-HO, in the analyzed geographical area and the reporting period.

The proposed HO performance indicators can be used to tune network parameters that affect the HO performance, for example a HO border. The HO border may be defined by an area in space at which users connected to a source cell initiate a HO toward a target cell. When the proposed indicators refer to intra-HO performance, and therefore they are calculated on a per-adjacency basis, they can be used to tune the intra-HO border between the source cell and the target cell of a same RAT. When the proposed indicators refer to iRAT HO performance, and therefore they are calculated on a per-cell basis, they can be used to tune the iRAT border between a source cell of a first RAT and a target cell of a second RAT. The HO border is usually determined by the signal quality (RSRQ in LTE) or signal level (RSRP in LTE).

The HO performance is directly affected by the HO border. A HO border close to the source cell may imply good HO performance, since users leave the source cell when the signal level from the source cell is still high. On the other hand, a HO border far from the source cell could cause poor HO performance, since users are forced to stay in the source cell even when signal level is very low, and therefore, they trigger the HO in poor radio link quality conditions.

Values of both indicators LowCqiRateWhenHo and LowUISinrRateWhenHo close to 0, indicate that iRAT HO performance is very good. This is a clear indication that iRAT HO border is properly configured and can even be moved further from the source cell as long as these indicators keep close to 0, in order to keep users in the desired technology.

On the other hand, if one of the indicators (LowCqiRateWhenHo or LowSinrRatePuschWhenHo) or both indicators at the same time have values close to 1, iRAT HO performance is inappropriate and iRAT HO border must be brought closer to the source cell in order to improve it.

Another possible action (but not the only one) when one or both of these indicators have values close to 1, instead of bringing iRAT HO border closer to source cell, might be to increase transmission power in the source cell to improve radio link quality of users in cell edge (i.e., users performing iRAT HO when the iRAT HO border is a long way from the source cell). Likewise, if both indicators have values close to 0, transmission power might be decreased to reduce interference to surrounding cells.

When the proposed indicators refer to intra-HO performance and therefore they are calculated on a per-adjacency basis, they can be used to avoid network performance degradation due to MLB process. Only if values of both indicators, LowCqiRateWhenHo and LowUISinrRateWhenHo, are close to 0, then the HO margin of that adjacency should be incremented to carry out MLB. In this respect, increasing or decreasing the HO margin is equivalent to respectively moving the HO border away from or closer to the source cell.

The proposed solution would be extended to GSM measuring RxQual (instead of CQI) and UL SINR for each user performing a HO, and to UMTS measuring CQI and UL SINR for each user performing a HO.

Advantages of the proposed indicators for tuning HO performance parameters include:
- Early detection: Unlike previous indicators (e.g. TLIH and TEIH), the indicators disclosed herein detect a poor HO performance before high-level performance indicators are degraded.
- Diversity: Unlike previous indicators (i.e. UIH), UL and DL channel quality is measured separately in methods and apparatus disclosed herein. While LowCqiRateWhenHo is a measure of DL channel quality before a HO, LowUISinrRateWhenHo is a measure of UL channel quality before a HO.
- Radio channel quality focused: Unlike TLIH and TEIH, the indicators disclosed herein are only based on radio channel conditions, CQI and UL SINR for DL and UL respectively.
- Whole range: Unlike previous indicators, the indicators disclosed herein not only measure extreme values, as very poor (e.g. TLIH) or very good (e.g. UIH) HO performance, but they classify each cell in a whole range from "very poor" to "very good" continuously.
- Low computational load: The methods and apparatus disclosed are based on time correlation between HO information and UE measurements, which typically requires linear operations (e.g., sum and product).
- Easy to explain: The proposed indicators are easy to explain, since they only reflect DL and UL connection quality just before HO.
- Easy to apply in SON OM: The indicators disclosed herein match with the operation flow of SON OM tool, where cell traces are collected during a certain reporting period, the cell traces are processed to build the performance indicators proposed herein, and finally parameter changes are made for the next reporting period.

Radio link measurements may be collected for a sufficiently large time period in the geographical area where HO performance is analyzed. Therefore, such radio link measurements should include information to link them with HO events. In current LTE networks, this piece of information is available in cell traces collected in a Network Management System (NMS). Thus, the methods and apparatus disclosed herein may comprise activating cell traces in cells under study.

Field trials have shown that, regardless of the radio access technology, activating cell traces on a large scale does not cause any processor overload or data storage problem, even in urban areas and at busy times. Nonetheless, CQI and UL SINR are always available in the eNodeB, since CQI must be reported by UEs to the eNodeB and UL SINR can be calculated directly in the eNodeB.

Disclosed herein is a system (and nodes of a system) in which a process is implemented to calculate the HO performance indicators discussed above.

Figure 1:
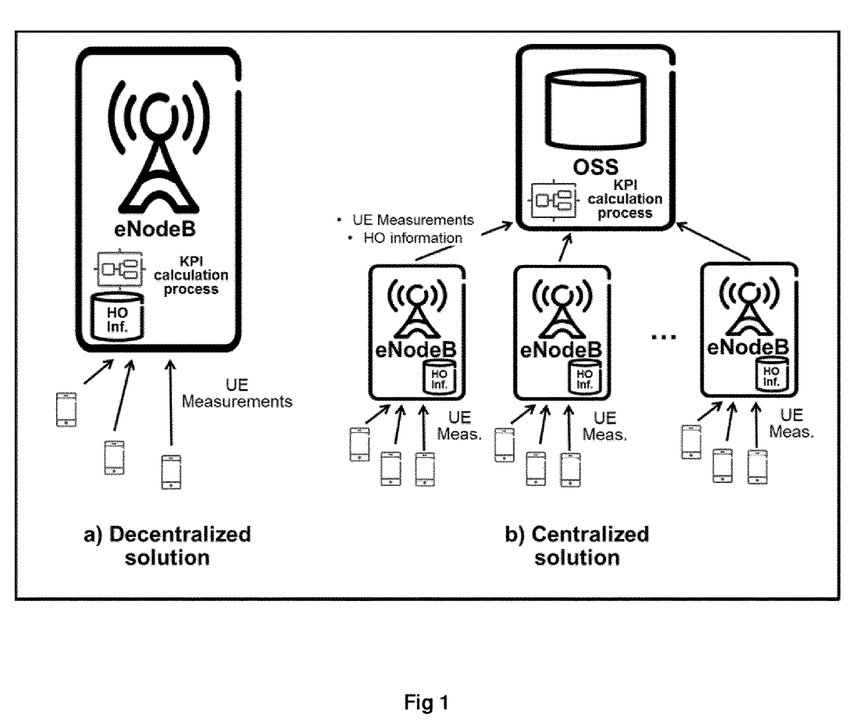
FIG. 1 is an architecture diagram of a telecommunication system.

FIG. 1 shows two basic architectural configurations of a network management system for computing HO performance indicators.

Figure 2:
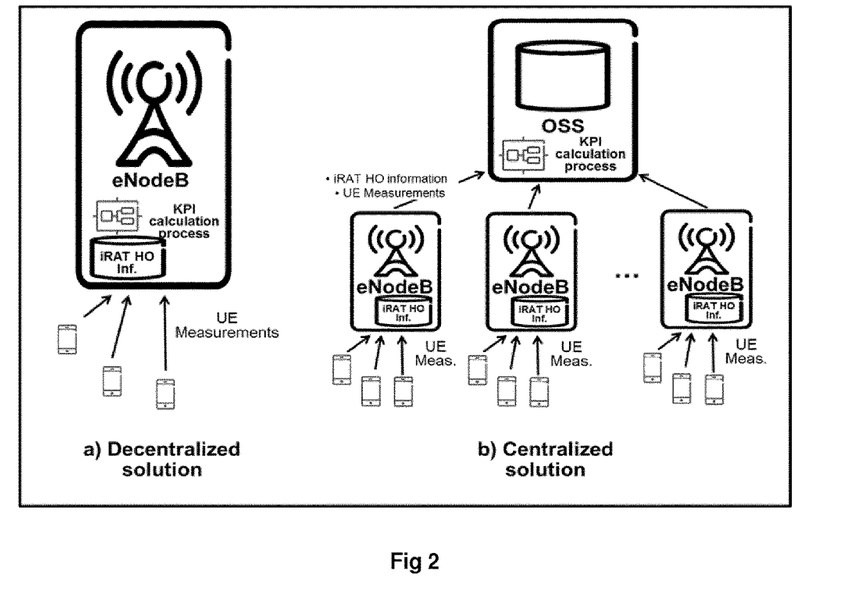
FIG. 2 is an architecture diagram of a telecommunication system.

FIG. 2 shows a particular view of FIG. 1 for computing the HO performance indicators applicable for an iRAT HO.

In a decentralized solution (FIG. 1a), the HO performance indicator calculation process is carried out in the eNodeB. The eNodeB collects radio link connection-quality measurements transmitted by the UEs (hereafter referred to as UE measurements). The subsequent HO performance indicator calculation process, executed in the eNodeB, is based on the received UE measurements and HO information in the eNodeB. Specifically, a plurality of the received UE measurements is selected based on the HO information to determine the UE measurements before a HO. The output of the process is a pair of values for the two HO performance indicators for each entity, e.g. cells in the eNodeB for inter-HO (or iRAT HO) performance indicators, and adjacencies (pairs of source and target cells) in the eNodeB for intra-HO performance indicators.

In a centralized solution (FIG. 1b), UE measurements are first collected by the eNodeB and then sent to e.g. an OSS together with HO information stored in the eNodeB. Then, the HO performance indicator calculation process is executed in the OSS. In this case, the output of the method is a pair of values for the two HO performance indicators for each adjacency/cell in the network.

Figure 3:
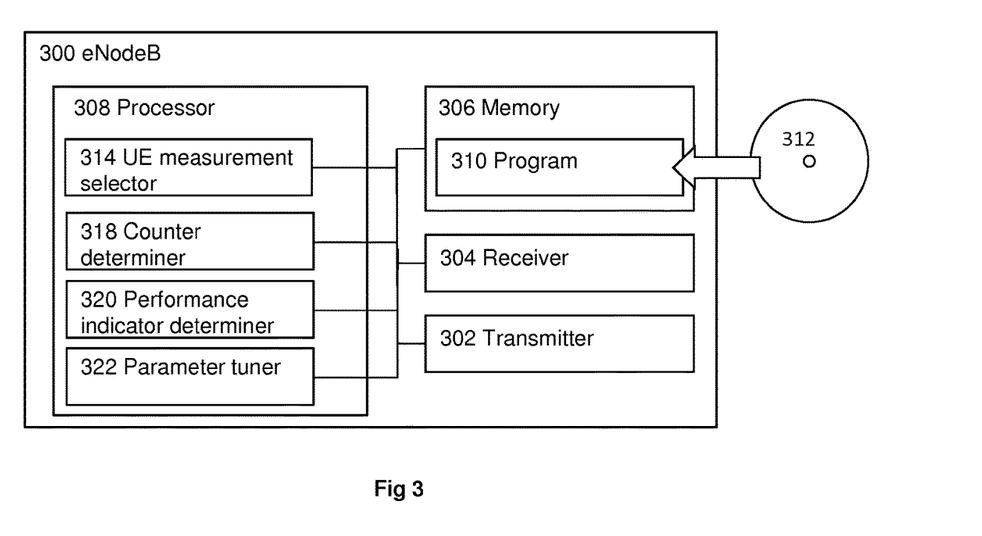
FIG. 3 is a block schematic diagram of a network node for use as an eNodeB.

FIG. 3 shows a schematic representation of an eNodeB 300. The eNodeB 300 comprises a transmitter 302 and a receiver 304. The transmitter 302 and receiver 304 are in electrical communication with other communication units, UEs, servers and/or functions in a telecommunications network and are configured to transmit and receive data accordingly.

It is noted that the term "electrical communication", unless otherwise stated, encompasses any one of wired and wireless electrical communication, or both.

Therefore, electrical communication may be, for example, a network communication over a wired connection or a network communication of over a radio frequency connection, or both.

The eNodeB 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake at least the functions of a UE measurement selector 314, a counter determiner 318, a performance indicator determiner 320 and a parameter tuner 322, as set out below.

Each of the transmitter 302 and receiver 304, memory 306, processor 308, UE measurement selector 314, counter determiner 318, performance indicator determiner 320 and parameter tuner 322 is in electrical communication with the other features 302, 304, 306, 308, 310, 314, 318, 320, 322 of the eNodeB 300. The eNodeB 300 can be implemented as a combination of computer hardware and software. In particular, the UE measurement selector 314, counter determiner 318, performance indicator determiner 320 and parameter tuner 322 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include the UE measurement selector 314, counter determiner 318, performance indicator determiner 320 and parameter tuner 322, but are not limited to such.

Figure 4:
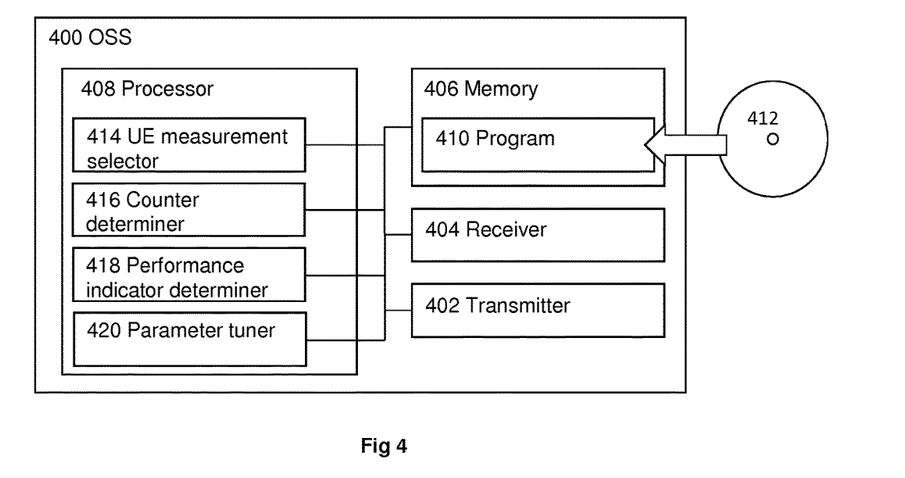
FIG. 4 is a block schematic of a network node for use as an Operations Support System.

FIG. 4 shows a schematic representation of an OSS 400. The OSS 400 comprises a transmitter 402 and a receiver 404. The transmitter 402 and receiver 404 are in electrical communication with other communication units, UEs, servers and/or functions in a telecommunications network and are configured to transmit and receive data accordingly.

The OSS 400 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake at least the functions of a UE measurement selector 414, counter determiner 416, performance indicator determiner 418 and parameter tuner 420, as set out below.

Each of the transmitter 402 and receiver 404, memory 406, processor 408, UE measurement selector 414, counter determiner 416, performance indicator determiner 418 and parameter tuner 420 is in electrical communication with the other features 402, 404, 406, 408, 410, 414, 416, 418, 420 of the OSS 400. The OSS 400 can be implemented as a combination of computer hardware and software. In particular, the UE measurement selector 414, counter determiner 416, performance indicator determiner 418 and parameter tuner 420 may be implemented as software configured to run on the processor 408. The memory 406 stores the various programs/executable files that are implemented by a processor 408, and also provide a storage unit for any required data. The programs/executable files stored in the memory 406, and implemented by the processor 408, can include the UE measurement selector 414, counter determiner 416, performance indicator determiner 418 and parameter tuner 420, but are not limited to such.

The methods disclosed herein comprise a methodology for calculating two HO performance indicators from radio UE measurements. The two HO performance indicators may be calculated on a per-cell basis, if they are related with inter-HO performance (entity e is a cell, namely a source cell <SC>), and they may also be calculated on a per-adjacency basis, if they are related with intra-HO performance (entity e is an adjacency, namely a pair of source and target cells <SC, TC>).

Figure 5:
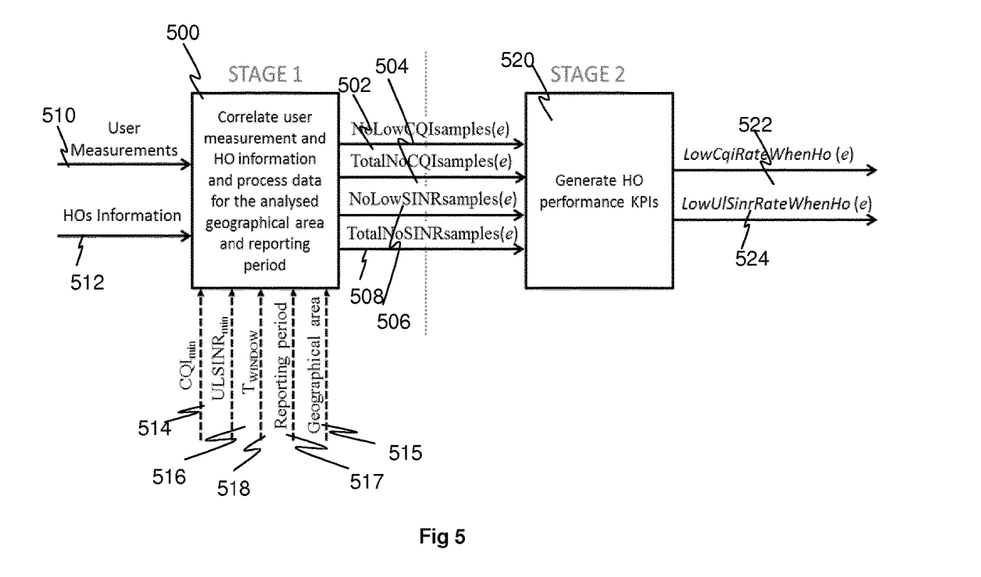
FIG. 5 is a block schematic diagram showing data flow in a process.

As shown in FIG. 5, the methodology comprises two stages. In a first stage 500, UE measurements during previous $T_{WINDOW}$ seconds before each HO are used to calculate four counters per entity e. The four counters are NoLowCQIsamples 502, TotalNoCQIsamples 504, NoLowSINRsamples 506 and TotalNoSINRsamples 508. The UE measurements during $T_{WINDOW}$ are determined by selecting the UE measurements 510 relating to the required time window based on HO information 512 providing the time of a HO. At least three setting parameters (defined below) are necessary during this stage: $CQI_{min}$ 514, $ULSINR_{min}$ 516 and $T_{WINDOW}$ 518. In addition, two advantageous setting parameters may also be used to further filter the UE measurements and/or HO information: reporting period 517 and geographical area 515.

In a second stage 520, the four counters 502-508 are used to derive two HO performance indicators LowCqiRateWhenHo 522 and LowUISinrRateWhenHo 524 showing HO performance in the DL and the UL channels, respectively.

As has been already explained, when these two HO performance indicators refer to inter-HO performance, also referred to as iRAT HO performance, and therefore they are calculated on a per-cell basis, particularly per-source-cell basis, they may be used to tune an iRAT HO border.

Values of both LowCqiRateWhenHo and LowUISinrRateWhenHo close to 0 indicate that iRAT HO performance is very good. This is a clear indication that iRAT HO border is properly configured, and it can be moved further away from the source cell as long as these HO performance indicators keep close to 0, in order to keep users in the desired RAT (e.g., LTE) for longer.

If one of the performance indicators (LowCqiRateWhenHo or LowUISinrRateWhenHo) or both at the same time have values close to 1, iRAT HO performance is inappropriate and the iRAT HO border should preferably be brought closer to the source cell, in order to improve it by transferring the user away from the source cell sooner.

When the two HO performance indicators refer to intra-HO performance and therefore they are calculated on a per-adjacency basis, they may be used to avoid network performance degradation due to an MLB process. The HO margin of an adjacency may be incremented to carry out MLB only if values of both indicators, LowCqiRateWhenHo and LowUISinrRateWhenHo, are close to 0 for that adjacency.

The HO performance indicators can be obtained by a centralized or a decentralized process, as shown in FIGS. 1a and 1b. In the centralized configuration, the calculation process is carried out in the OSS, which receives UE measurements and HO information from the eNodeB. In the decentralized configuration, the calculation process is carried out in the eNodeB, which receives UE measurements from the UEs.

Each of the stages 500, 520 of an exemplary method is discussed below.

In stage 1 500, UE measurements 510 with values of CQI and UL SINR for each UE together with a UE identifier are received by the node (OSS or eNodeB) of the network undertaking the method. HO information 512 is also used in stage 1 500. The HO information includes identifiers of UEs (u), a source cell (SC) for both the cases of iRAT HO and intra-HO. In addition, for intra-HO, the HO information includes a target cell (TC). Each UE measurement 510 is hereafter referred to as sample, which has a certain value, such as a CQI value or a UL SINR value.

In the decentralized configuration, UE measurements are received by the eNodeB from the UEs and the HO information is available in the eNodeB itself. In the centralized configuration, UE measurements are received by the eNodeB from the UEs and the UE measurements and the HO information are transmitted from the eNodeB to the OSS. In current LTE networks, UE measurements and HO information are available at eNodeB.

Other optional inputs to stage 1 500 may include a geographical area 515 and a reporting period 517, defined by the network operator, which are used to filter out unnecessary information in cell traces. The reporting period is, in particular, the period during which events (measurements and HO) are collected to calculate the HO performance indicators, e.g. a 1-hour period or a 1-day period. The geographical area may indicate the cells where the HO performance indicators are going to be calculated.

In addition, $CQI_{min}$ 514, which is the DL connection quality threshold defining the CQI value below which a CQI is considered too low, $ULSINR_{min}$ 516, which is the UL connection quality threshold defining the UL SINR value below which a SINR is considered too low and $T_{WINDOW}$ 518, which is the processing time window defining the number of seconds before a HO when radio measurements are taken into account, are all fed into stage 1 500.

From the inputs to stage 1 500, the four counters 502-508 are obtained for each entity e:

NoLowCQIsamples(e): The number of CQI samples with a CQI value lower than or equal to $CQI_{min}$ measured within the $T_{WINDOW}$ before the HO for all users that performed the HO and per-entity basis.

TotalNoCQIsamples(e): The total number of CQI samples measured within a time window ($T_{WINDOW}$) before the HO for all users that performed the HO and per-entity basis.

NoLowSINRsamples(e): The number of UL SINR samples with a UL SINR value lower than or equal to $ULSINR_{min}$ measured within the $T_{WINDOW}$ before the HO for all users that performed the HO and per-entity basis.

TotalNoSINRsamples(e): The total number of UL SINR samples measured within a time window ($T_{WINDOW}$) before the HO for all users that performed the HO and per-entity basis.

Figure 6:
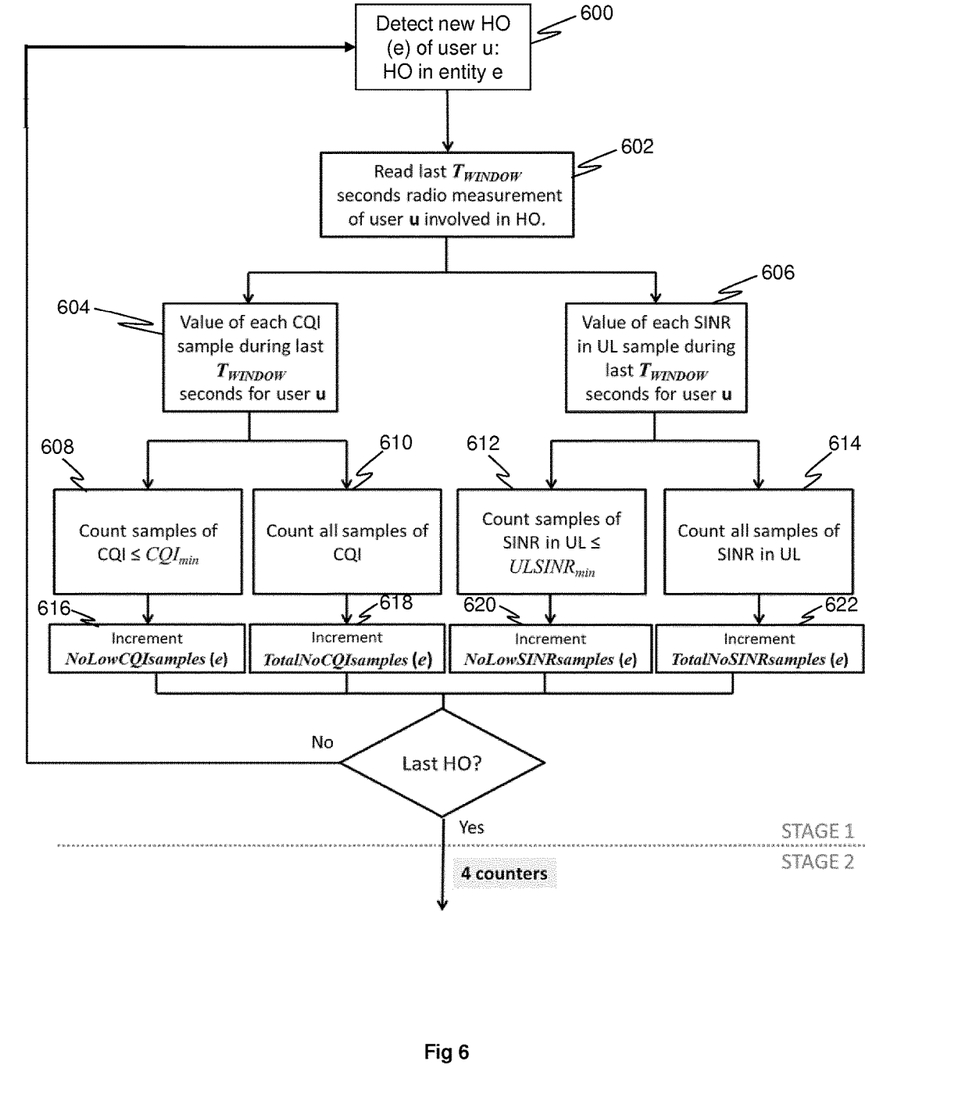
FIG. 6 is a flow diagram for a first stage of a process.

FIG. 6 shows a flow diagram of an exemplary method to obtain the four above-mentioned counters in stage 1 500.

The method starts by detecting 600 at the UE measurement selector 314 the time when a HO is triggered and the UE triggering the HO is identified. For each HO, a UE measurement selector 314 of the eNodeB selects 602 radio link measurements (UE measurements) in the previous $T_{WINDOW}$ seconds for the identified UE. For example, in current LTE networks, information including CQI and UL SINR statistics is stored in the eNodeB in the form of histograms for memory reasons. CQI histograms include one bin per possible CQI value (i.e., an integer between e.g. 0 and 15), and SINR histograms use a reasonable number of bins covering the full range of values.

In the centralized configuration, the eNodeB transmits the selected UE measurements and the HO information to the OSS and the determination of the four counters and the HO performance indicators is undertaken by the OSS. In the decentralized configuration, the eNodeB undertakes the determination of the four counters and the HO performance indicators. The description of the remainder of the exemplary method below covers both the centralized and decentralized configurations.

From the selected UE measurements, a UE measurement selector (314 in the eNodeB or 414 in the OSS) retrieves 604, 606 the value of each CQI sample during $T_{WINDOW}$ and the value of SINR sample in the UL during $T_{WINDOW}$. For the detected HO of the identified UE, a counter determiner (318 in the eNodeB or 416 in the OSS) determines 608 the number of CQI samples in the retrieved CQI samples with a value less than or equal to $CQI_{min}$ (NoLowCQIsamples(e, u)) and also determines 610 the total number of CQI samples (TotalNoCQIsamples(e,u,)). For the detected HO of the identified UE, the counter determiner (318 in the eNodeB or 416 in the OSS) determines 612 the number of UL SINR samples in the retrieved UL SINR samples with a value less than or equal to $ULSINR_{min}$ (NoLowSINRsamples(e,u)) and also determines 614 the total number of UL SINR samples (TotalNoSINRsamples(e,u)).

The counter determiner 318, 416 adds 616-622 the determined quantities NoLowCQIsamples(e, u), TotalNoCQIsamples(e, u), NoLowSINRsamples(e, u) and TotalNoSINRsamples(e, u) to corresponding running totals NoLowCQIsamples(e), TotalNoCQIsamples(e), NoLowSINRsamples(e) and TotalNoSINRsamples(e) of each entity e where the HO took place. The running totals are determined according to $$NoLowCQIsamples(e) = \sum_u NoLowCQIsamples(e, u)$$

$$TotalNoCQIsamples(e) = \sum_u TotalNoCQIsamples(e, u)$$

$$NoLowSINRsamples(e) = \sum_u NoLowSINRsamples(e, u)$$

$$TotalNoSINRsamples(e) = \sum_u TotalNoSINRsamples(e, u)$$

The above process is repeated for each HO carried out in the geographical area and reporting period defined by the operator.

Figure 7:
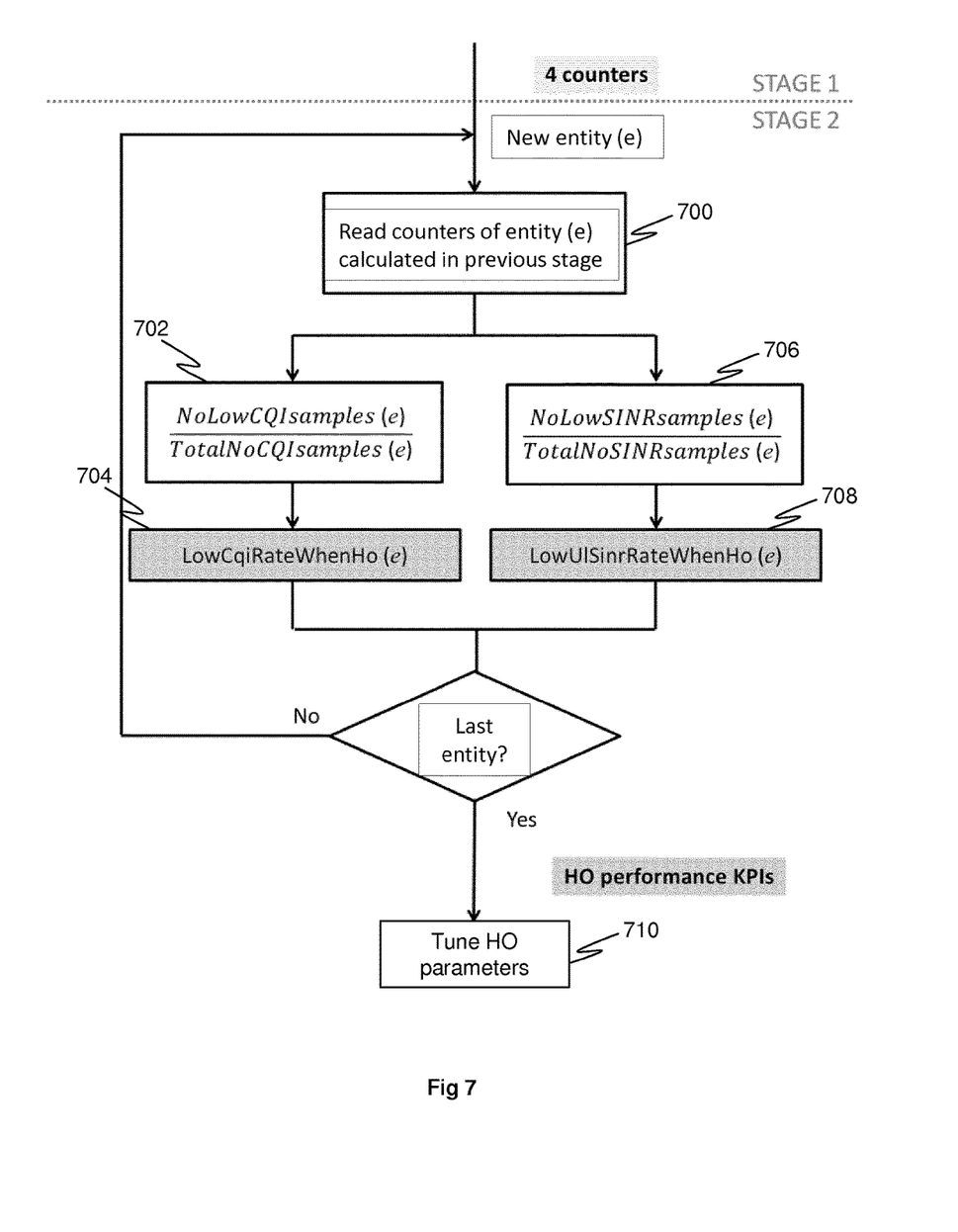
FIG. 7 is a flow diagram for a second stage of a process.

Once the four counters are obtained, they are used by a performance indicator determiner (320 in the eNodeB or 418 in the OSS) to compute the HO performance indicators, as shown in FIG. 7, which shows a flow diagram for an exemplary method of implementing stage 2 520. For each entity e, the HO performance indicators are calculated according to $$LowCqiRateWhenHo(e) = \frac{NoLowCQIsamples(e)}{TotalNoCQIsamples(e)}$$

$$LowUlSinrRateWhenHo(e) = \frac{NoLowSINRsamples(e)}{TotalNoSINRsamples(e)}$$

Specifically, the performance indicator determiner 320, 418 reads 700 the four counters for entity e. The performance indicator determiner 320, 418 determines 702 and stores 704 the HO performance indicator LowCqiRateWhenHo. The performance indicator determiner 320, 418 may also determine 706 and stores 708 the HO performance indicator LowUlSinrRateWhenHo.

The above process is repeated for all entities (cells or adjacencies). The determined HO performance indicators may be used by the parameter tuner (322 in the eNodeB or 420 in the OSS) to tune HO parameters to improve HO performance.

Typically, SON algorithms for optimizing iRAT parameters are implemented as iterative optimization processes, where small parameter changes are carried out based on performance indicators collected during a reporting period. These algorithms use performance indicators that suggest parameter changes (drivers), as well as performance indicators that avoid excessive changes on parameters (brakes).

The HO performance indicators disclosed herein may be calculated for inter-HO and can be used as inputs (drivers and brakes) to an iRAT parameter optimization algorithm implemented in SON OM.

The inter-HO performance indicators disclosed herein have been successfully used to optimize iRAT HO parameters in a live network. Field trial results (not shown here) prove that: a) it is possible to increase traffic on LTE by delaying iRAT HO from LTE to 2G or 3G in those cells with good iRAT HO performance, and b) overall connection quality can be improved by triggering iRAT HO earlier from LTE to 2G or 3G in those cells with poor iRAT HO performance.

In the following paragraphs, it is shown that the proposed inter-HO performance indicators calculated on a per-cell basis and inter-HO performance are highly correlated to other high-level performance indicators, such as Retainability Rate and HO Successful Rate. Retainability Rate is defined as the ratio between abnormal connection releases and the total number of releases, and HO Successful Rate is defined as the ratio of successful HOs and the total number of HO attempts.

The dataset consists of measurements taken from 699 cells during 1 day (each data sample represents one cell during fifteen minutes). Cells are deployed in an urban area using two carriers at 734 MHz and 2.132 GHz and a system bandwidth of 10 MHz and 5 MHz respectively. To compute the proposed indicators, the internal parameters $CQI_{min}$, $ULSINR_{min}$, and $T_{WINDOW}$ may be configured to approximately 5, −2 dB and 10 seconds, respectively. $CQI_{min}$ may be in a range from 0 to 15 and may have an integer value. $ULSINR_{min}$ may be in a range from −5 dB to 17 dB. $T_{WINDOW}$ may be in the order of seconds.

To check the correlation between indicators, data samples (i.e., cell and fifteen minutes) have been ordered based on the value of the HO performance indicators (i.e., LowCqiRateWhenHo or LowUISinrRateWhenHo) in ascending order. The data samples are divided into 15 groups each comprising 2000 data samples (note that 15 groups when data samples are ordered by LowCqiRateWhenHo are other than groups when data samples are ordered by LowUISinrRateWhenHo). For each group, the following indicators are calculated:

Median of LowCqiRateWhenHo (for samples ordered by LowCqiRateWhenHo)
$90^{th}$ percentile of Retainability Rate.
$20^{th}$ percentile of HO Successful Rate.
Median of LowUISinrRateWhenHo (for samples ordered by LowUISinrRateWhen Ho)

Figure 8:
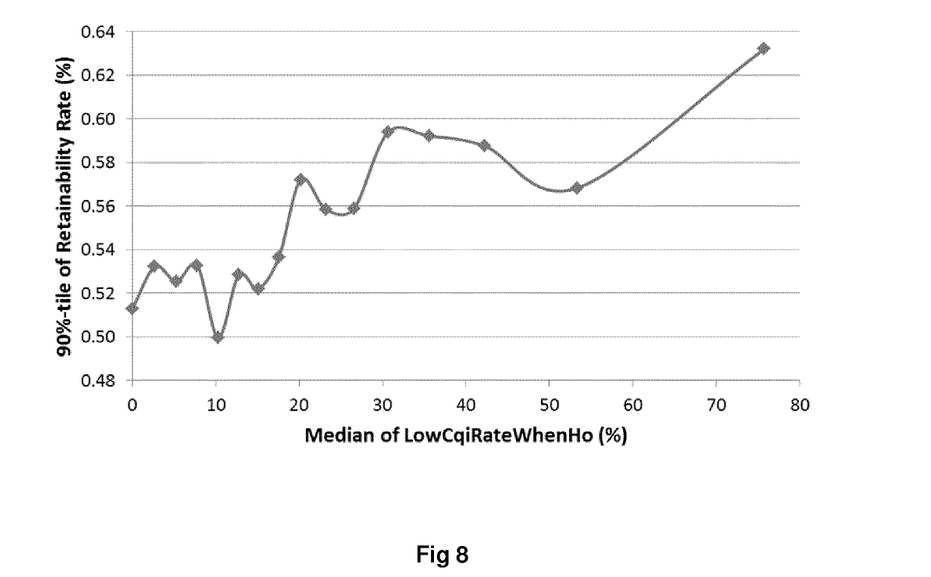
FIGS. 8-10 are plots of experimental results.
Figure 9:
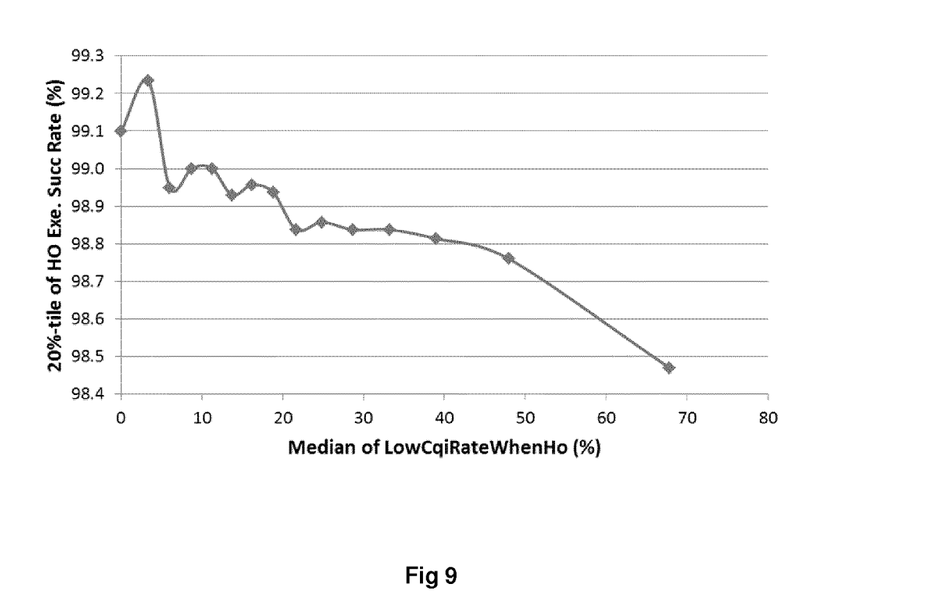

For groups ordered by LowCqiRateWhenHo, results are showed in FIGS. 8 and 9. As can be seen, LowCqiRateWhenHo has a clear impact on Retainability Rate and HO Successful Rate. For high values of LowCqiRateWhenHo, $90^{th}$ percentile of Retainability Rate increases clearly, reaching values higher than 0.62%. Although the increase is not steady, the relation between both indicators is evidenced. As was expected, if iRAT HO is delayed too long, triggering it too late, and therefore, with bad DL radio channel conditions, the probability of dropping a UE increases. Similarly, in FIG. 9, the correlation between LowCqiRateWhenHo and HO Successful Rate is observed. The $20^{th}$ percentile of HO Successful Rate is clearly degraded when LowCqiRateWhenHo is too high. Delaying iRAT HOs, users may be forced to trigger intra-HO with very low values of RSRP, which increases the probability of HO fail. These tests also evidence that iRAT HO performance may affect intra-HO performance and that the two HO performance indicators proposed throughout this specification can effectively be used to improve both iRAT HO performance and intra-HO performance.

Figure 10:
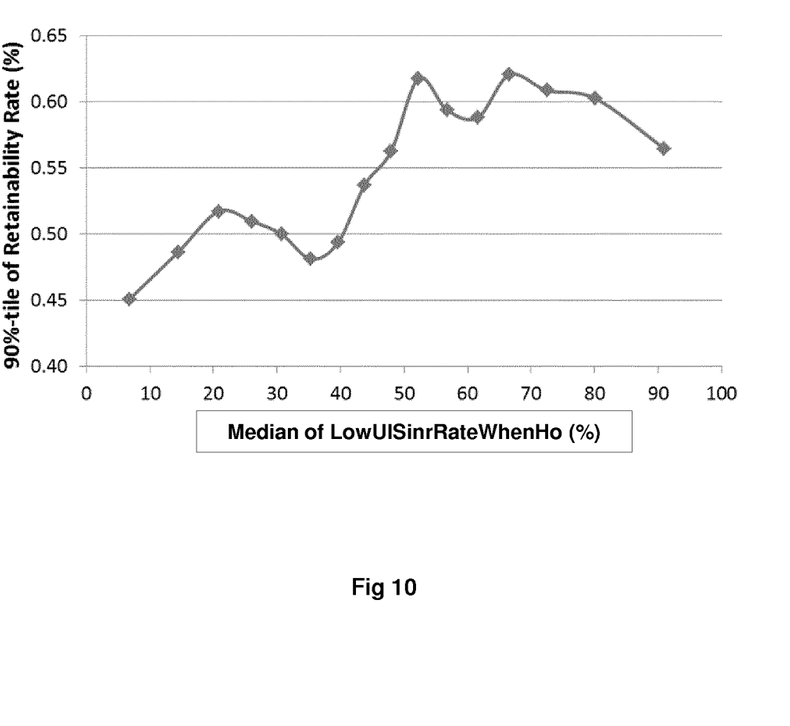

For groups ordered by LowUISinrRateWhenHo, FIG. 10 shows the correlation between LowUISinrRateWhenHo and Retainability Rate. As can be seen, LowUISinrRateWhenHo has a clear impact on Retainability Rate. The $90^{th}$ percentile of Retainability Rate increases significantly for values of LowUISinrRateWhenHo higher than 40%. As the case was for poor quality in the DL channel, when the UL channel is degraded excessively retarding HO, the probability of dropping a UE is increased. The importance of checking the UL channel quality before triggering a HO and before moving the LTE border further away from (or closer to) the source cell is evidenced, and therefore, so is the usefulness of LowUISinrRateWhenHo indicator.

The exemplary methods and apparatus disclosed throughout this specification provide for two new HO performance indicators (computed on a per-cell basis when they refer to inter-HO performance and on a per-adjacency basis when they refer to intra-HO performance), LowCqiRateWhenIratHo and LowUISinrRateWhenIratHo. These two HO performance indicators show radio link conditions before a HO for the DL and UL channels respectively. When the two HO performance indicators are calculated for inter-HOs, operators can know whether users could be kept e.g. on LTE longer, or, in contrast, inter-HO should be triggered earlier to avoid connection problems. When the two HO performance indicators are calculated for intra-HOs, operators can use them to perform MLB only over adjacencies where it will not be harmful. Unlike previous approaches, the two HO performance indicators are able to detect problems before they occur, and they are focused on both the DL and UL radio channel conditions. This solution can be implemented as a centralized solution in the OSS or as a decentralized solution in the eNodeB. Although the invention is generally defined and explained for LTE networks, it can be extended to other RATs.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A network node in a telecommunications network for control of handover triggers, the network node comprising:
 a receiver circuitry configured to receive Uplink, UL, and Downlink, DL, quality data samples of a user equipment, UE, the quality data samples comprising a plurality of UL Signal to Interference plus Noise Ratio, ULSINR, data samples relating to the quality of an UL channel and a plurality of Channel Quality Indicator, CQI, data samples relating to the quality of a DL channel;
 a UE measurement selector circuitry configured, following a handover of the UE from a source cell to a target cell, to select, from the received ULSINR data samples and CQI data samples, data samples relating to a time period preceding the handover;
 a performance indicator determiner circuitry configured to determine at least two performance indicators indicating the performance of the handover, based on a number of selected ULSINR data samples, NoLowSINRsamples, with a value lower than a ULSINR threshold, ULSINRmin, and based on a number of CQI data samples, NoLowCQIsamples, with a value lower than a CQI threshold value, CQImin; and
 a parameter tuner circuitry configured to tune one or more parameters controlling triggers of subsequent handovers, based on the determined performance indicators.

2. A network node according to claim 1, wherein the one or more tuned parameters control at least one trigger of: increasing a handover margin for a subsequent handover; and decreasing a handover margin for a subsequent handover.

3. A network node according to claim 1, further comprising a counter determiner circuitry configured to determine NoLowCQIsamples.

4. A network node according to claim 3, wherein the counter determiner circuitry is further configured to determine NoLowSINRsamples.

5. A network node according to claim 3, wherein the counter determiner circuitry is further configured to determine a total number of CQI data samples, TotalNoCQIsamples, in the selected CQI samples.

6. A network node according to claim 4, wherein the counter determiner circuitry is further configured to determine a total number of ULSINR data samples, TotalNoSINRsamples, in the selected ULSINR samples.

7. A network node according to claim 5, wherein the performance indicator determiner circuitry is configured to determine the at least two performance indicators based on a ratio of NoLowSINRsamples, to TotalNoSINRsamples and a ratio of NoLowCQIsamples to TotalNoCQIsamples.

8. A network node according to claim 1, wherein the handover is an inter Radio Access Technology handover, hereinafter iRAT HO, between a first Radio Access Technology, RAT, and a second RAT, wherein the source cell is a cell of the first RAT and the target cell is a cell of the second RAT, and wherein the selected data samples and computations thereof apply on a per-source-cell basis.

9. A network node according to claim 8, wherein the one or more parameters are tuned by the parameter tuner to move iRAT HO border, between the source cell and the target cell, closer to the source cell, if at least one of the two performance indicators is higher than a performance high-threshold.

10. A network node according to claim 8, wherein the one or more parameters are tuned by the parameter tuner circuitry to move iRAT HO border, between the source cell and the target cell, away from the source cell, if both two performance indicators are lower than a performance low-threshold.

11. A network node according to claim 1, wherein the handover is an intra Radio Access Technology handover, hereinafter intra-HO, wherein the source and target cells are cells of a same Radio Access Technology, RAT, wherein the source and target cells are adjacent cells and wherein the selected data samples and computations thereof apply on a per-adjacency basis.

12. A network node according to claim 11, wherein the one or more parameters are tuned by the parameter tuner circuitry to move intra-HO border, between the source cell and the target cell, away from the source cell, if both two performance indicators are lower than a performance low-threshold value.

13. A network node according to claim 11, wherein the one or more parameters are tuned by the parameter tuner circuitry to move intra-HO border, between the source cell and the target cell, closer to the source cell, if at least one of the two performance indicators is higher than a performance high-threshold value.

14. A network node according to claim 11, wherein the one or more parameters are tuned by the parameter tuner circuitry to increase a handover margin between the source cell and the target cell to carry out Mobility Load Balancing, MLB, by moving intra-HO border, between the source cell and the target cell, away from the source cell, if both two performance indicators are below a performance low-threshold value.

15. A network node according to claim 11, wherein the one or more parameters are tuned by the parameter tuner circuitry to decrease a handover margin between the source cell and the target cell to carry out Mobility Load Balancing, MLB, by moving intra-HO border, between the source cell and the target cell, closer to the source cell, if at least one of the two performance indicators is above a performance high-threshold value.

16. A method for operating a network node in a telecommunications network for control of handover triggers, the method comprising:
receiving, by a receiver circuitry, Uplink, UL, and Downlink, DL, quality data samples of a user equipment, UE, the quality data samples comprising a plurality of UL Signal to Interference plus Noise Ratio, ULSINR, data samples relating to the quality of an UL channel and a plurality of Channel Quality Indicator, CQI, data samples relating to the quality of a DL channel;
selecting, by a UE measurement selector circuitry following a handover of the UE from a source cell to a target cell, from the received ULSINR data samples and CQI data samples, data samples relating to a time period preceding the handover;
determining, by a performance indicator determiner circuitry, at least two performance indicators indicating the performance of the handover, based on a number of selected ULSINR data samples, NoLowSINRsamples, with a value lower than a ULSINR threshold, ULSINRmin, and based on a number of CQI data samples, NoLowCQIsamples, with a value lower than a CQI threshold value, CQImin; and
tuning, by a parameter tuner circuitry, one or more parameters controlling triggers of subsequent handovers, based on the determined performance indicators.

17. A method according to claim 16, wherein the one or more tuned parameters control at least one trigger of: increasing a handover margin for a subsequent handover; and decreasing a handover margin for a subsequent handover.

18. A method according to claim 16, further comprising a counter determiner circuitry for determining NoLowCQIsamples.

19. A method according to claim 16, further comprising a counter determiner circuitry for determining NoLowCQIsamples.

20. A method according to claim 18, wherein the counter determiner circuitry determines a total number of CQI data samples, TotalNoCQIsamples, in the selected CQI samples.

21. A method according to claim 19, wherein the counter determiner circuitry determines a total number of ULSINR data samples, TotalNoSINRsamples, in the selected ULSINR samples.

22. A method according to claim 20, wherein the performance indicator determiner circuitry is configured to determine the at least two performance indicators based on a ratio of NoLowSINRsamples, to TotalNoSINRsamples and a ratio of NoLowCQIsamples to TotalNoCQIsamples.

23. A method according to claim 16, wherein the handover is an inter Radio Access Technology handover, hereinafter iRAT HO, between a first Radio Access Technology, RAT, and a second RAT, wherein the source cell is a cell of the first RAT and the target cell is a cell of the second RAT, and wherein the selected data samples and computations thereof apply on a per-source-cell basis.

24. A method according to claim 23, wherein the one or more parameters are tuned by the parameter tuner circuitry to move iRAT HO border, between the source cell and the target cell, closer to the source cell, if at least one of the two performance indicators is higher than a performance high-threshold.

25. A method according to claim 23, wherein the one or more parameters are tuned by the parameter tuner to move iRAT HO border, between the source cell and the target cell, away from the source cell, if both two performance indicators are lower than a performance low-threshold.

26. A method according to claim 16, wherein the handover is an intra Radio Access Technology handover, hereinafter intra-HO, wherein the source and target cells are cells of a same Radio Access Technology, RAT, wherein the source and target cells are adjacent cells and wherein the selected data samples and computations thereof apply on a per-adjacency basis.

27. A method according to claim 26, wherein the one or more parameters are tuned by the parameter tuner to move intra-HO border, between the source cell and the target cell, away from the source cell, if both two performance indicators are lower than a performance low-threshold value.

28. A method according to claim 26, wherein the one or more parameters are tuned by the parameter tuner circuitry to move intra-HO border, between the source cell and the target cell, closer to the source cell, if at least one of the two performance indicators is higher than a performance high-threshold value.

29. A method according to claim 26, wherein the one or more parameters are tuned by the parameter tuner circuitry to increase a handover margin between the source cell and the target cell to carry out Mobility Load Balancing, MLB, by moving intra-HO border, between the source cell and the target cell, away from the source cell, if both two performance indicators are below a performance low-threshold value.

30. A method according to claim 26, wherein the one or more parameters are tuned by the parameter tuner circuitry to decrease a handover margin between the source cell and the target cell to carry out Mobility Load Balancing, MLB, by moving intra-HO border, between the source cell and the target cell, closer to the source cell, if at least one of the two performance indicators is above a performance high-threshold value.

31. A non-transitory computer storage medium storing computer readable code which, when executed on at least one processor, cause the at least one processor to carry out the method according to claim 16.

* * * * *